(12) United States Patent
Nakajima et al.

(10) Patent No.: US 11,380,884 B2
(45) Date of Patent: Jul. 5, 2022

(54) LIQUID COMPOSITION FOR PRODUCING ELECTRODE COMPOSITE MATERIAL, METHOD FOR PRODUCING ELECTRODE, AND METHOD FOR PRODUCING ELECTROCHEMICAL ELEMENT

(71) Applicant: RICOH COMPANY, LTD., Tokyo (JP)

(72) Inventors: Satoshi Nakajima, Tokyo (JP); Eiko Hibino, Kanagawa (JP); Hiromichi Kuriyama, Kanagawa (JP); Keigo Takauji, Kanagawa (JP); Miku Ohkimoto, Kanagawa (JP); Shigeo Takeuchi, Kanagawa (JP); Masahiro Masuzawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/727,999

(22) Filed: Dec. 27, 2019

(65) Prior Publication Data

US 2020/0220160 A1   Jul. 9, 2020

(30) Foreign Application Priority Data

Jan. 8, 2019  (JP) .............................. JP2019-001414
Nov. 1, 2019  (JP) .............................. JP2019-200162

(51) Int. Cl.
*H01M 4/36* (2006.01)
*H01M 4/62* (2006.01)
*H01M 10/0525* (2010.01)
*H01M 4/04* (2006.01)

(52) U.S. Cl.
CPC ......... *H01M 4/362* (2013.01); *H01M 4/0404* (2013.01); *H01M 4/622* (2013.01); *H01M 10/0525* (2013.01)

(58) Field of Classification Search
CPC ................. H01M 4/505; H01M 4/525; H01M 200/0094; H01M 2220/00; H01M 10/0525; H01M 4/139; H01M 4/622; H01M 4/362
See application file for complete search history.

(56) References Cited

U.S. PATENT DOCUMENTS

| | | | | |
|---|---|---|---|---|
| 2008/0113271 A1* | 5/2008 | Ueda | ....................... | H01M 4/38 429/231.95 |
| 2008/0118826 A1* | 5/2008 | Shimamura | ............. | H01M 6/48 429/129 |
| 2010/0099026 A1* | 4/2010 | Choi | ................... | H01M 4/1391 429/212 |

(Continued)

FOREIGN PATENT DOCUMENTS

| | | |
|---|---|---|
| JP | 8-124560 | 5/1996 |
| JP | 10-092416 | 4/1998 |

(Continued)

*Primary Examiner* — Tabassom Tadayyon Eslami
(74) *Attorney, Agent, or Firm* — Grüneberg and Myers PLLC

(57) ABSTRACT

A liquid composition for an electrode composite material is provided. The liquid composition comprises an active material, a dispersion medium, and a polymerizable compound. A viscosity of the liquid composition at 25 degrees C. is a viscosity at which the liquid composition is dischargeable from a liquid discharge head.

21 Claims, 7 Drawing Sheets

(56) References Cited

U.S. PATENT DOCUMENTS

| | | | | |
|---|---|---|---|---|
| 2013/0224562 A1* | 8/2013 | Momo | ................... | H01G 11/78 |
| | | | | 429/149 |
| 2017/0373284 A1* | 12/2017 | Durstock | ............ | H01M 10/056 |
| 2018/0261827 A1 | 9/2018 | Yanagita et al. | | |
| 2018/0375089 A1* | 12/2018 | Gonser | ................ | H01M 4/366 |
| 2019/0288276 A1 | 9/2019 | Utsuki et al. | | |

FOREIGN PATENT DOCUMENTS

| | | | |
|---|---|---|---|
| JP | 2009-152180 | | 7/2009 |
| JP | 2010-097946 | | 4/2010 |
| WO | 2018/164076 | * | 6/2018 |

* cited by examiner

LIQUID COMPOSITION FOR PRODUCING ELECTRODE COMPOSITE MATERIAL, METHOD FOR PRODUCING ELECTRODE, AND METHOD FOR PRODUCING ELECTROCHEMICAL ELEMENT

CROSS-REFERENCE TO RELATED APPLICATIONS

This patent application is based on and claims priority pursuant to 35 U.S.C. § 119(a) to Japanese Patent Application Nos. 2019-001414 and 2019-200162, filed on Jan. 8, 2019 and Nov. 1, 2019, respectively, in the Japan Patent Office, the entire disclosure of which is hereby incorporated by reference herein.

BACKGROUND

Technical Field

The present disclosure relates to a liquid composition for producing an electrode composite material, a method for producing an electrode, and a method for producing an electrochemical element.

Description of the Related Art

The demand for lithium ion secondary batteries, mounted on portable devices, hybrid cars, electric cars, and the like, is growing. In addition, the need for thin batteries to be mounted on various wearable devices and medical patches is increasing, thus the demand for lithium ion secondary batteries is diversifying.

One known conventional method for producing an electrode constituting a lithium ion secondary battery involves applying a liquid composition on an electrode substrate using a die coater, a comma coater, a reverse roll coater, or the like to form an electrode composite material.

Such a liquid composition for producing an electrode composite material generally contains an active material, a dispersion medium, and a binder. The viscosity thereof is high because the binder is dissolved in the dispersion medium.

However, when the viscosity of the liquid composition for producing an electrode composite material is high, the productivity of the resulting electrode is lowered.

SUMMARY

In accordance with some embodiments of the present invention, a liquid composition for an electrode composite material is provided. The liquid composition comprises an active material, a dispersion medium, and a polymerizable compound. A viscosity of the liquid composition at 25 degrees C. is a viscosity at which the liquid composition is dischargeable from a liquid discharge head.

In accordance with some embodiments of the present invention, a method for producing an electrode is provided. The method includes the step of applying the above-described liquid composition to an electrode substrate.

In accordance with some embodiments of the present invention, a method for producing an electrochemical element is provided. The method includes the step of producing an electrode by the above-described method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
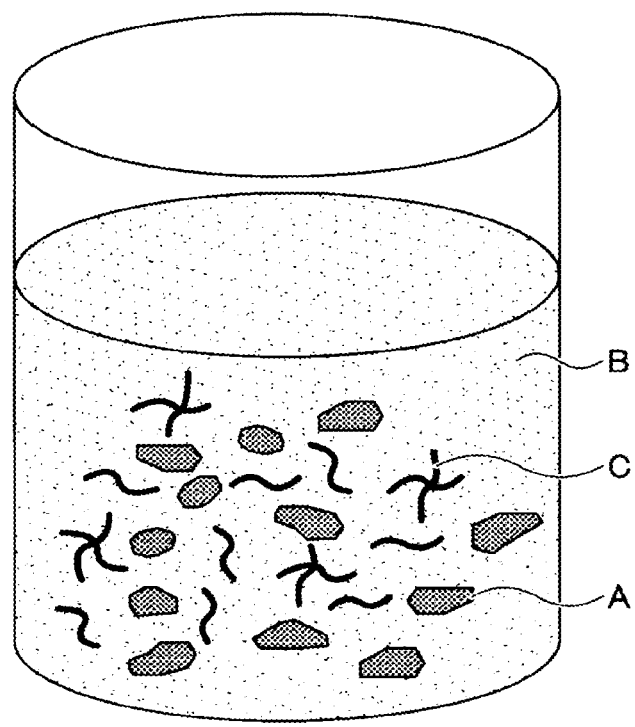
FIG. 1 is a schematic diagram illustrating a liquid composition for producing an electrode composite material according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An electrode which is produced by printing an electrode composition by a liquid discharge method such as inkjet printing has a drawback that the peel strength of the electrode composite material is low.

According to some embodiments of the present invention, a liquid composition for producing an electrode composite material is provided that has low viscosity and provides an electrode having high peel strength.

Embodiments of the present invention are described in detail below with reference to the drawings. In each drawing, the same reference numerals are given to the same components, and redundant explanation may be omitted.

Liquid Composition for Producing Electrode Composite Material

The liquid composition for producing an electrode composite material (hereinafter simply "liquid composition") of the present embodiment contains an active material A, a dispersion medium B, and a polymerizable compound C (see FIG. 1). The liquid composition may further contain a conductive auxiliary agent, a dispersant, and the like, if necessary.

The viscosity of the liquid composition at 25 degrees C. is a viscosity at which the liquid composition is dischargeable from a liquid discharge head and is preferably 50 mPa·s or less. When the viscosity of the liquid composition at 25 degrees C. is 50 mPa·s or less, the change in particle size distribution of the liquid composition is less likely to occur, so that the discharge stability of the liquid composition is improved.

Preferably, the viscosity of the liquid composition at 25 degrees C. is 9.5 mPa·s or more. When the viscosity of the liquid composition at 25 degrees C. is 9.5 mPa·s or more, the liquid composition is easily discharged as droplets, and the discharge amount is easily controlled.

Here, the liquid composition of the present embodiment can be used for producing an electrode of an electrochemical element.

The electrochemical element has electrodes arranged on both sides of an insulator and stores electrical energy.

Active Material

Examples of the active material include positive electrode active materials and negative electrode active materials.

One type of positive electrode active material or negative electrode active material may be used alone, or two or more types thereof may be used in combination.

The positive electrode active material is not particularly limited as long as it is capable of being reversibly intercalated or deintercalated with an alkali metal ion. Examples thereof include, but are not limited to, alkali-metal-containing transition metal compounds.

Examples of the alkali-metal-containing transition metal compounds include, but are not limited to, lithium-containing transition metal compounds such as a composite oxide comprising lithium and one or more elements selected from the group consisting of cobalt, manganese, nickel, chromium, iron, and vanadium.

Examples of the lithium-containing transition metal compounds include, but are not limited to, lithium cobalt oxide, lithium nickel oxide, and lithium manganese oxide.

Examples of the alkali-metal-containing transition metal compounds further include polyanionic compounds having a tetrahedron represented by $XO_4$ (X represents P, S, As, Mo, W, Si, etc.) in the crystal structure. Among these, lithium-containing transition metal phosphate compounds such as lithium iron phosphate and lithium vanadium phosphate are preferred in terms of cycle characteristics, and lithium vanadium phosphate is particularly preferred in terms of lithium diffusion coefficient and output characteristics.

Preferably, the polyanionic compounds are surface-coated with a conductive auxiliary agent such as a carbon material for electron conductivity.

The negative electrode active material is not particularly limited as long as it is capable of being reversibly intercalated or deintercalated with an alkali metal ion. Examples thereof include, but are not limited to, carbon materials including graphite having a graphite-type crystal structure.

Examples of the carbon materials include, but are not limited to, natural graphite, synthetic graphite, poorly-graphitizable carbon (hard carbon), and easily-graphitizable carbon (soft carbon).

Examples of the negative electrode active material other than the carbon materials include, but are not limited to, lithium titanate and titanium oxide.

For energy density of non-aqueous power storage elements, high capacity materials such as silicon, tin, silicon alloy, tin alloy, silicon oxide, silicon nitride, and tin oxide can also be used as the negative electrode active material.

The maximum particle diameter of the active material is preferably equal to or smaller than the nozzle diameter of the liquid discharge head. In this case, discharge stability of the liquid composition is improved.

The mode diameter of the active material is preferably 3 μm or less, and more preferably 1 μm or less. When the mode diameter of the active material is 3 μm or less, storage stability of the liquid composition is improved.

In addition, preferably, the mode diameter of the active material is 0.5 μm or more.

The 10% diameter ($D_{10}$) of the active material is preferably 0.1 μm or more, and more preferably 0.15 μm or more. When $D_{10}$ of the active material is 0.1 μm or more, storage stability of the liquid composition is improved.

In addition, preferably, $D_{10}$ of the active material is 0.8 μm or less.

The proportion of the active material in the liquid composition is preferably 20% by mass or more, and more preferably 25% by mass or more. When the proportion of the active material in the liquid composition is 20% by mass or more, the capacity of the electrochemical element is improved.

In addition, preferably, the proportion of the active material in the liquid composition is 50% by mass or less.

Dispersion Medium

The dispersion medium is not particularly limited as long as it is capable of dispersing the active material. Examples thereof include, but are not limited to, aqueous dispersion media such as water, ethylene glycol and propylene glycol, and organic dispersion media such as N-methyl-2-pyrrolidone, 2-pyrrolidone, cyclohexanone, butyl acetate, mesitylene, 2-n-butoxymethanol, 2-dimethylethanol, and N,N-dimethylacetamide.

Preferably, the dispersion medium contains a porogen. In this case, communicated voids are formed in the electrode composite material. As a result, the electrode composite material is improved in non-aqueous electrolytic solution retention ability, which is advantageous for ion diffusion, thus providing an electrochemical element having a large capacity per unit area of the electrode.

The porogen is not particularly limited as long as it is capable of dissolving the polymerizable compound and phase-separating the resulting polymer as the polymerization of the polymerizable compound proceeds. Examples thereof include, but are not limited to, glycol monoethers such as dipropylene glycol monomethyl ether (DPGME), diethylene glycol monomethyl ether (DEGME), ethylene glycol monobutyl ether (EGBE), esters such as γ-butyrolactone and propylene carbonate, and amides such as N,N-dimethylacetamide.

Each of these dispersion media may be used alone or in combination with others.

Polymerizable Compound

The polymerizable compound is preferably used in combination with a polymerization initiator or a catalyst.

The polymerizable compound may be either monofunctional or polyfunctional.

Here, being monofunctional refers to having one polymerizable group, and being polyfunctional refers to having two or more polymerizable groups.

The polyfunctional polymerizable compound is not particularly limited as long as it is polymerizable by heating or irradiation with non-ionizing radiation, ionizing radiation, infrared rays, or the like. Examples thereof include, but are not limited to, acrylate, methacrylate, urethane acrylate resin, vinyl ester resin, unsaturated polyester, epoxy resin, oxetane resin, vinyl ether, and a resin utilizing an ene-thiol reaction. Among these, acrylate, methacrylate, urethane acrylate resin, and vinyl ester resin are preferred for productivity.

A polyfunctional acrylate acts as a Michael acceptor and causes a polyaddition reaction with a Michael donor.

Examples of the polyfunctional acrylate include, but are not limited to, low-molecular difunctional acrylates such as dipropylene glycol diacrylate and neopentyl glycol diacrylate; high-molecular difunctional acrylates such as polyethylene glycol diacrylate, urethane acrylate, and epoxy acrylate; trifunctional acrylates such as trimethylolpropane triacrylate and pentaerythritol triacrylate; and tetrafunctional or higher acrylates such as pentaerythritol tetraacrylate and dipentaerythritol hexaacrylate.

Examples of the Michael donor include, but are not limited to, polyfunctional amines and polyfunctional thiols.

Examples of the amines include, but are not limited to, ethylenediamine, 1,3-diaminopropane, 1,4-diaminobutane, 1,5-diaminopentane, 1,6-diaminohexane, 1,2-phenylenediamine, 1,3-phenylenediamine, and 1,4-phenylenediamine.

Examples of the thiols include, but are not limited to, 1,2-ethanedithiol, 1,3-propanedithiol, 1,4-butanedithiol, 2,3-butanedithiol, 1,5-pentanedithiol, 1,6-hexanedithiol, 1,2-benzenedithiol, 1,3-benzenedithiol, 1,4-benzenedithiol, 1,3,5-benzenetrithiol, and 4,4-biphenyldithiol.

As the catalyst for the polyaddition reaction, a catalyst usually used for the Michael addition reaction can be appropriately selected. Examples thereof include, but are not limited to, amine catalysts such as diazabicycloundecene (DBU) and N-methyldicyclohexylamine, base catalysts such as sodium methoxide, sodium ethoxide, potassium t-butoxide, sodium hydroxide, and tetramethylammonium hydroxide, metallic sodium, and butyllithium.

Examples of the polymerizable compound capable of addition-polymerizing (radial-polymerizing) include, but are not limited to, esters obtained by epoxidizing a double bond of a terpene having an unsaturated bond (such as myrcene, carene, ocimene, pinene, limonene, camphene, terpinolene, tricyclene, terpinene, fenchene, phellandrene, sylvestrene, sabinene, dipentene, bornene, isopulegol, and carvone) and adducting acrylic acid or methacrylic acid thereto; esters of a terpene-derived alcohol (such as citronellol, pinocampheol, geraniol, fenchyl alcohol, nerol, borneol, linalool, menthol, terpineol, thujyl alcohol, citronellal, ionone, irone, cinerol, citral, pinol, cyclocitral, carvomenthone, ascaridole, safranal, piperitol, menthene monool, dihydrocarvone, carveol, sclareol, manool, hinokiol, ferruginol, totarol, sugiol, farnesol, patchouli alcohol, nerolidol, carotol, cadinol, lanceol, eudesmol, and phytol) with acrylic acid or methacrylic acid; citronellolic acid, hinokiic acid, and santalic acid; and acrylates or methacrylates having a side chain having the backbone of menthone, carvotanacetone, phellandral, pimelitenone, perillaldehyde, thujone, calone, dageton, camphor, bisabolene, santalene, zingiberene, caryophyllene, curcumene, cedrene, cadinene, longifolene, sesquibenihene, cedrol, guaiol, kessoglycol, cyperone, eremophilone, zerumbone, camphorene, podocarprene, mylene, phyllocladene, totalene, ketomanoyl oxide, manoyl oxide, abietic acid, pimaric acid, neoabietic acid, levopimaric acid, iso-d-pimaric acid, agathene dicarboxylic acid, rubenic acid, carotenoid, peryl aldehyde, piperitone, ascaridole, pimene, fenchene, a sesquiterpene, a diterpene, or a triterpene.

Examples of the polymerization initiator include, but are not limited to, photopolymerization initiators and thermal polymerization initiators.

Examples of the photopolymerization initiators include photoradical generators.

Examples of the photoradical generators include, but are not limited to, α-hydroxyacetophenone, α-aminoacetophenone, 4-aroyl-1,3-dioxolane, benzyl ketal, 2,2-diethoxyacetophenone, p-dimethylaminoacetophene, p-dimethylaminopropiophenone, benzophenone, 2-chlorobenzophenone, 4,4'-dichlorobenzophenone, 4,4'-bis(diethylamino)benzophenone, Michler's ketone, benzil, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, (1-hydroxycyclohexyl) phenyl ketone, 2-hydroxy-2-methyl-1-phenyl-1-one, 1-(4-isopropylphenyl)-2-hydroxy-2-methylpropane-1-one, methyl benzoylformate, benzoin alkyl ethers such as benzoin isopropyl ether, benzoin methyl ether, benzoin ethyl ether, benzoin isobutyl ether, benzoin n-butyl ether, and benzoin n-propyl ether, (1-hydroxycyclohexyl) phenyl ketone, 2-benzyl-2-dimethylamino-1-(4-morpholinophenyl)butanone-1, (1-hydroxycyclohexyl) phenyl ketone, 2,2-dimethoxy-1,2-diphenylethane-1-one, bis($\eta^5$-2,4-cyclopentadiene-1-yl)-bis[2,6-difluoro-3-(1H-pyrrole-1-yl)phenyl] titanium, bis(2,4,6-trimethylbenzoyl)phenylphosphine oxide, 2-methyl-1-[4-(methylthio)phenyl]-2-morpholinopropane-1-one, 2-hydroxy-2-methyl-1-phenylpropane-1-one (DAROCURE 1173), bis(2,6-dimethoxybenzoyl)-2,4,4-trimethylpentylphosphine oxide, 1-[4-(2-hydroxyethoxy)phenyl]-2-hydroxy-2-methyl-1-propane-1-one, monoacylphosphine oxide, disacylphosphine oxide, titanocene, fluorescein, anthraquinone, thioxanthone, xanthone, lophine dimer, trihalomethyl compounds, dihalomethyl compounds, active ester compounds, and organic boron compounds.

Photo-cross-linking radical generators such as bisazide compounds (e.g., 2,2'-azobis(2,4-dimethylvaleronitrile)) may be used in combination with the photoradical generators.

Examples of the thermal polymerization initiators include, but are not limited to, azobisisobutyronitrile (AIBN).

As the polymerization initiator, a photoacid generator may also be used. In this case, when the applied liquid composition is irradiated with light, the photoacid generator generates an acid and the polymerizable compound is polymerized.

Examples of the polymerizable compound which is polymerizable in the presence of an acid include, but are not limited to, monomers having a cationically-polymerizable vinyl group, such as compounds having a cyclic ether group such as epoxy group, oxetane group, and oxolane group, acrylic compounds or vinyl compounds having the above-described substituent on a side chain, carbonate compounds, low-molecular-weight melamine compounds, vinyl ethers, vinylcarbazoles, styrene derivatives, α-methylstyrene derivatives, and vinyl alcohol esters such as ester compounds of vinyl alcohols with acrylic acid or methacrylic acid.

Examples of the photoacid generator include, but are not limited to, onium salts, diazonium salts, quinone diazide, organic halides, aromatic sulfonate, bisulfone compounds, sulfonyl compounds, sulfonate, sulfonium salts, sulfamide, iodonium salts, and sulfonyl diazomethane compounds. Of these, onium salts are preferable.

Examples of the onium salts include, but are not limited to, diazonium salts, phosphonium salts, and sulfonium salts, each containing fluoroborate ion, hexafluoroantimonate ion, hexafluoroarsenate ion, trifluoromethanesulfonate ion, or p-toluenesulfonate ion as a counter ion.

Examples of the photoacid generator further include halogenated triazine.

Each of these photoacid generators may be used alone or in combination with others.

When the photoacid generator is used, a sensitizing dye may be used in combination.

Examples of the sensitizing dye include, but are not limited to, acridine, benzoflavin, perylene, anthracene, and laser dyes.

Conductive Auxiliary Agent

Examples of the conductive auxiliary agent include, but are not limited to, conductive carbon black produced by a furnace method, an acetylene method, or a gasification method, and carbon materials such as carbon nanofiber, carbon nanotube, graphene, and graphite particles. Examples of the conductive auxiliary agent other than carbon materials include, but are not limited to, particles and fibers of metals such as aluminum. The conductive auxiliary agent may be combined with the active material in advance.

The mass ratio of the conductive auxiliary agent to the active material is preferably 10% or less, and more preferably 8% or less. When the mass ratio of the conductive auxiliary agent to the active material is 10% or less, the stability of the liquid composition for producing an electrode composite material is improved. When the mass ratio of the conductive auxiliary agent to the active material is 8% or less, the stability of the liquid composition for producing an electrode composite material is more improved.

Dispersant

The dispersant is not particularly limited as long as it is capable of improving dispersibility of the active material and the conductive auxiliary agent in the dispersion medium. Examples thereof include, but are not limited to, polymer dispersants such as polycarboxylic acid dispersants, naphthalenesulfonate formalin condensate dispersants, polyethylene glycol, polycarboxylic acid partial alkyl ester dispersants, polyether dispersants, and polyalkylene polyamine dispersants; surfactant-type dispersants such as alkyl sulfonic acid dispersants, quaternary ammonium salt dispersants, higher alcohol alkylene oxide dispersants, polyol ester dispersants, and alkylpolyamine dispersants; and inorganic dispersants such as polyphosphate dispersants.

Method for Producing Electrode

The method for producing an electrode of the present embodiment includes the process of applying the liquid composition of the present embodiment to an electrode substrate.

The method for applying the liquid composition is not particularly limited. Examples thereof include, but are not limited to, spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and liquid discharge printing. Among these, liquid discharge printing is particularly preferred for the productivity of electrode.

Figure 2:
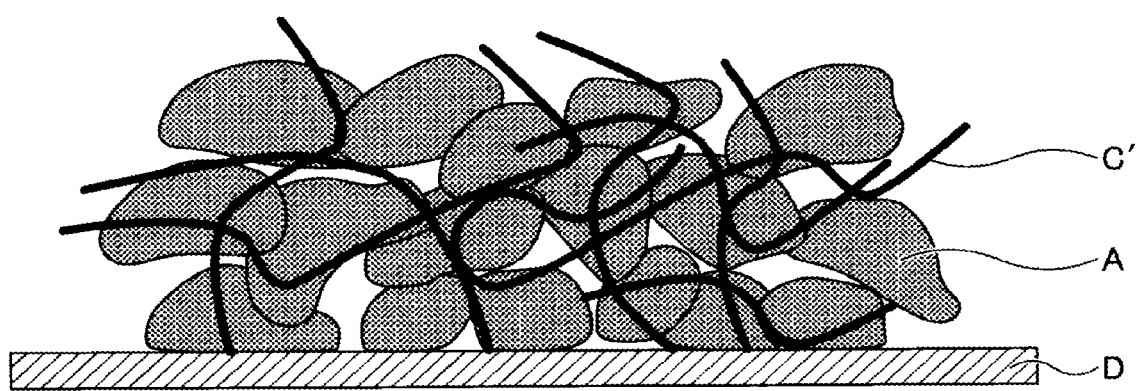
FIG. 2 is a schematic diagram illustrating an electrode produced by a method for producing an electrode according to an embodiment of the present invention.

After the liquid composition has been applied to an electrode substrate D, the polymerizable compound C is polymerized by heating or irradiation with non-ionizing radiation, ionizing radiation, infrared rays, or the like, and a binder C' is produced (see FIG. 2).

The material constituting the electrode substrate (current collector) is not particularly limited as long as it has conductivity and is stable with respect to the applied potential.

Negative Electrode

Figure 3:
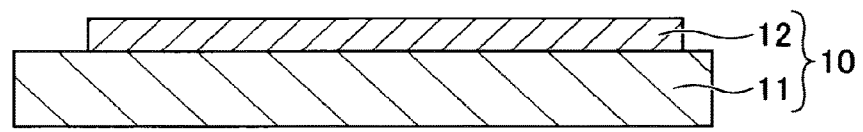
FIG. 3 is a cross-sectional diagram illustrating a negative electrode according to an embodiment of the present invention.

FIG. 3 is a schematic diagram illustrating a negative electrode of the present embodiment.

A negative electrode 10 has a negative electrode composite layer 12 formed on one surface of a negative electrode substrate 11.

The negative electrode composite layer 12 may be formed on both surfaces of the negative electrode substrate 11.

The negative electrode 10 is not particularly limited in shape and may be in a flat-plate form.

Examples of the material constituting the negative electrode substrate 11 include, but are not limited to, stainless steel, nickel, aluminum, and copper.

Method for Producing Negative Electrode

Figure 4:
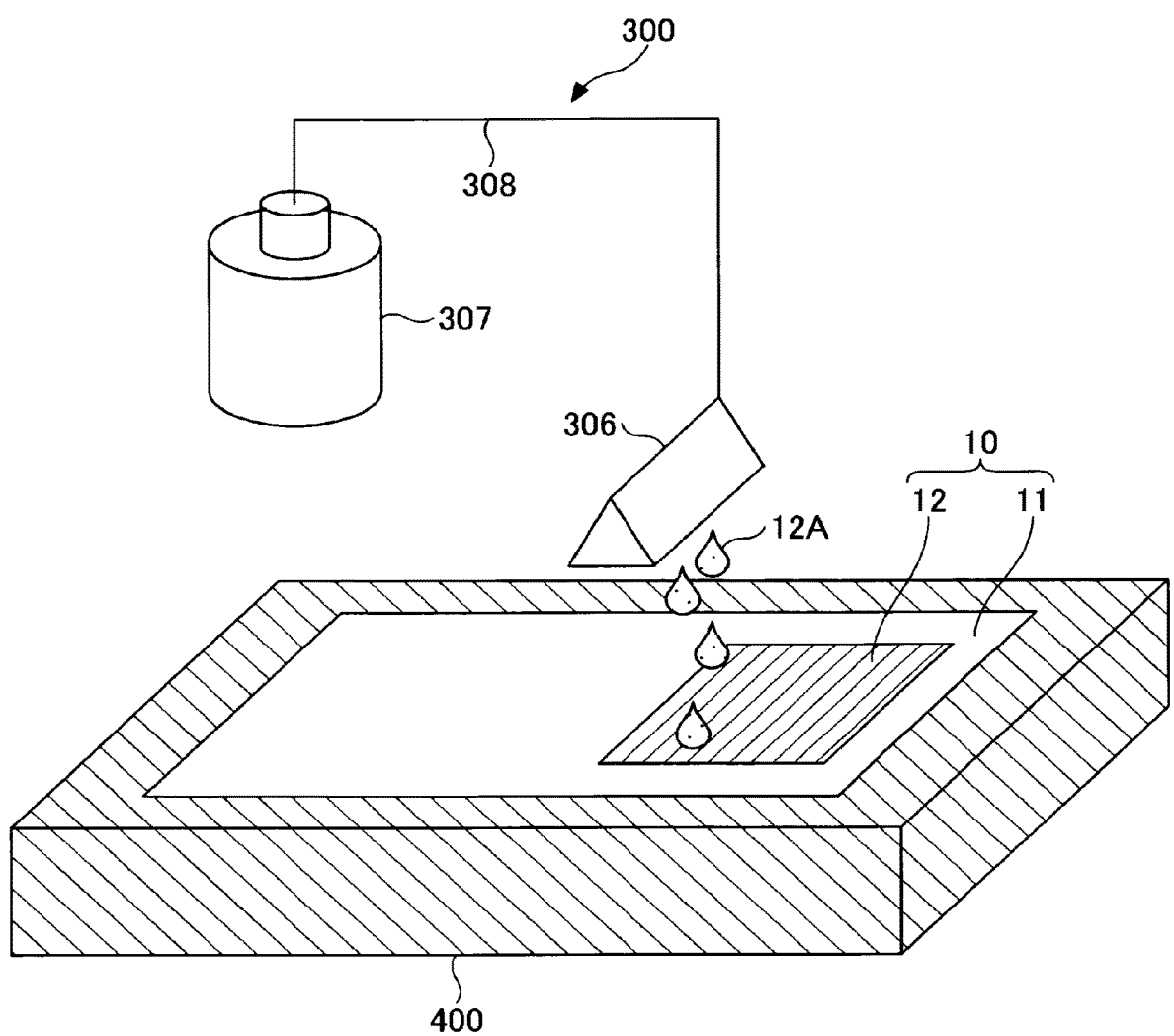
FIG. 4 is a schematic diagram illustrating a method for producing a negative electrode according to an embodiment of the present invention.

FIG. 4 is a schematic diagram illustrating a method for producing the negative electrode of the present embodiment.

The method for producing the negative electrode 10 includes a process of discharging a liquid composition 12A for producing the negative electrode composite layer 12 onto the negative electrode substrate 11 by a liquid discharger 300.

The liquid composition 12A contains a negative electrode active material, a dispersion medium, and a polymerizable compound. The viscosity thereof at 25 degrees C. is a viscosity at which the liquid composition 12A is dischargeable from a liquid discharge head 306.

The liquid composition 12A is stored in a tank 307 and is supplied from the tank 307 to the liquid discharge head 306 via a tube 308.

The liquid discharger 300 may be provided with a nozzle capping mechanism to prevent the liquid discharge head 306 from drying when the liquid composition 12A is not discharged therefrom.

In producing the negative electrode 10, the negative electrode substrate 11 is placed on a stage 400 capable of heating, then droplets of the liquid composition 12A are discharged onto the negative electrode substrate 11 and heated. At this time, the stage 400 may move, or the liquid discharge head 306 may move.

The heating of the liquid composition 12A discharged onto the negative electrode substrate 11 may be performed by either the stage 400 or a heating mechanism other than the stage 400.

The heating mechanism is not particularly limited as long as it does not come into direct contact with the liquid composition 12A. Examples thereof include, but are not limited to, a resistance heater, an infrared heater, and a fan heater.

A plurality of heating mechanisms may be provided.

The heating temperature is not particularly limited as long as the polymerizable compound is polymerized, and is preferably in the range of from 70 to 150 degrees C. in view of energy used.

During heating of the liquid composition 12A discharged onto the negative electrode substrate 11, ultraviolet rays may be emitted thereto.

Figure 5:
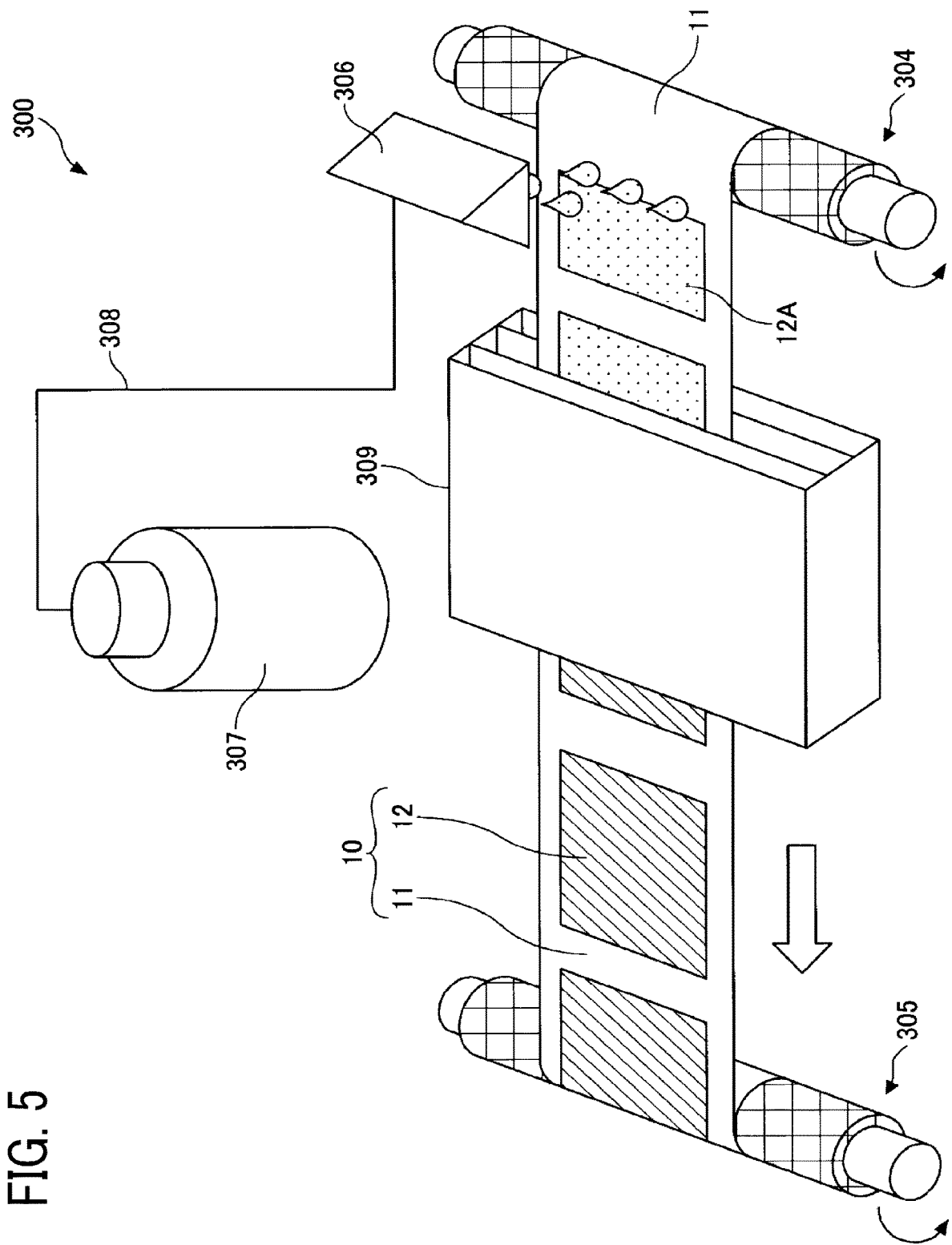
FIG. 5 is a schematic diagram illustrating another method for producing a negative electrode according to an embodiment of the present invention.

FIG. 5 is a schematic diagram illustrating another method for producing the negative electrode of the present embodiment.

The method for producing the negative electrode 10 includes a process of discharging the liquid composition 12A onto the negative electrode substrate 11 by the liquid discharger 300.

First, the negative electrode substrate 11 having an elongated shape is prepared. The negative electrode substrate 11 is wound around a cylindrical core and set on a send-out roller 304 and a take-up roller 305 so that the side on which the negative electrode composite layer 12 is to be formed faces upward in FIG. 5. The send-out roller 304 and the take-up roller 305 rotate counterclockwise to convey the negative electrode substrate 11 from right to left in FIG. 5. The liquid discharge head 306 disposed above the negative electrode substrate 11 between the send-out roller 304 and the take-up roller 305 then discharges droplets of the liquid composition 12A onto the negative electrode substrate 11 being conveyed. Droplets of the liquid composition 12A are discharged so as to cover at least a part of the negative electrode substrate 11.

A plurality of liquid discharge heads 306 may be provided in a direction substantially parallel to or substantially perpendicular to the direction of conveyance of the negative electrode substrate 11.

Next, the negative electrode substrate 11 onto which the liquid composition 12A has been discharged is conveyed to a heating mechanism 309 by the send-out roller 304 and the take-up roller 305. As a result, the polymerizable compound contained in the liquid composition 12A on the negative electrode substrate 11 is polymerized to form the negative electrode composite layer 12, thus forming the negative electrode 10. The negative electrode 10 is cut into a piece with a desired size by punching or the like.

The heating mechanism 309 is not particularly limited as long as it does not come into direct contact with the liquid composition 12A. Examples thereof include, but are not limited to, a resistance heater, an infrared heater, and a fan heater.

The heating mechanism 309 may be disposed either above or below the negative electrode substrate 11, or a plurality of heating mechanisms 309 may be provided.

The heating temperature is not particularly limited as long as the polymerizable compound is polymerized, and is preferably in the range of from 70 to 150 degrees C. in view of energy used.

During heating of the liquid composition 12A discharged onto the negative electrode substrate 11, ultraviolet rays may be emitted thereto.

Figure 6:
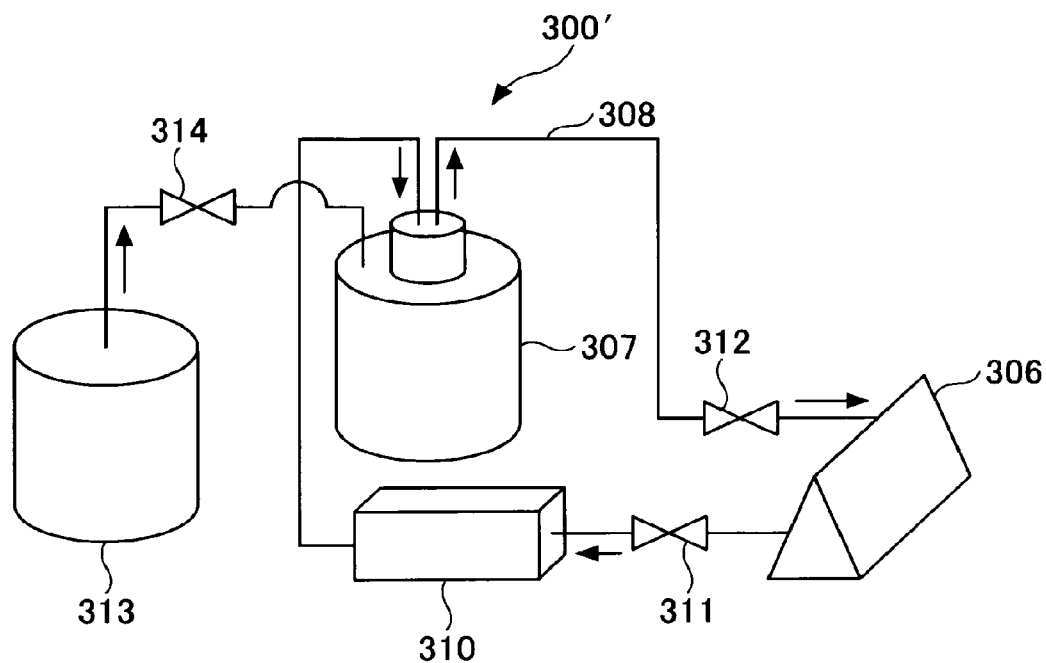
FIG. 6 is a schematic diagram illustrating a modification of the liquid discharger illustrating in FIGS. 4 and 5.

FIG. 6 is a schematic diagram illustrating a modification of the liquid discharger 300.

A liquid discharger 300' circulates the liquid composition 12A within the liquid discharge head 306, the tank 307, and the tube 308 by controlling a pump 310 and valves 311 and 312.

The liquid discharger 300' is provided with an external tank 313. When the amount of the liquid composition 12A in the tank 307 is reduced, the liquid discharger 300' supplies the liquid composition 12A from the tank 313 to the tank 307 by controlling the pump 310 and the valves 311, 312, and 314.

The liquid dischargers 300 and 300' are capable of discharging the liquid composition 12A to a targeted position on the negative electrode substrate 11. In addition, the liquid dischargers 300 and 300' are capable of boding the surfaces of the negative electrode substrate 11 and the negative electrode composite layer 12 which are in contact with each other. Furthermore, the liquid dischargers 300 and 300' are capable of making the thickness of the negative electrode composite layer 12 uniform.

Positive Electrode

Figure 7:
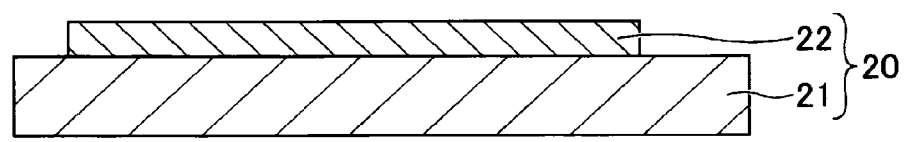
FIG. 7 is a cross-sectional diagram illustrating a positive electrode according to an embodiment of the present invention.

FIG. 7 is a schematic diagram illustrating a positive electrode of the present embodiment.

A positive electrode 20 has a positive electrode composite layer 22 formed on one surface of a positive electrode substrate 21.

The positive electrode composite layer 22 may be formed on both surfaces of the positive electrode substrate 21.

The positive electrode 20 is not particularly limited in shape and may be in a flat-plate form.

Examples of the material constituting the positive electrode substrate 21 include, but are not limited to, stainless steel, aluminum, titanium, and tantalum.

Method for Producing Positive Electrode

The method for producing the positive electrode 20 is the same as the method for producing the negative electrode 10 except that a liquid composition for producing the positive electrode composite layer 22 is discharged onto the positive electrode substrate 21.

The liquid composition for producing the positive electrode composite layer 22 contains a positive electrode active material, a dispersion medium, and a polymerizable compound. The viscosity thereof at 25 degrees C. is a viscosity at which the liquid composition is dischargeable from a liquid discharge head.

Method for Producing Electrochemical Element

The method for producing an electrochemical element of the present embodiment includes the process of producing an electrode by the method for producing an electrode of the present embodiment.

Electrode Element

Figure 8:
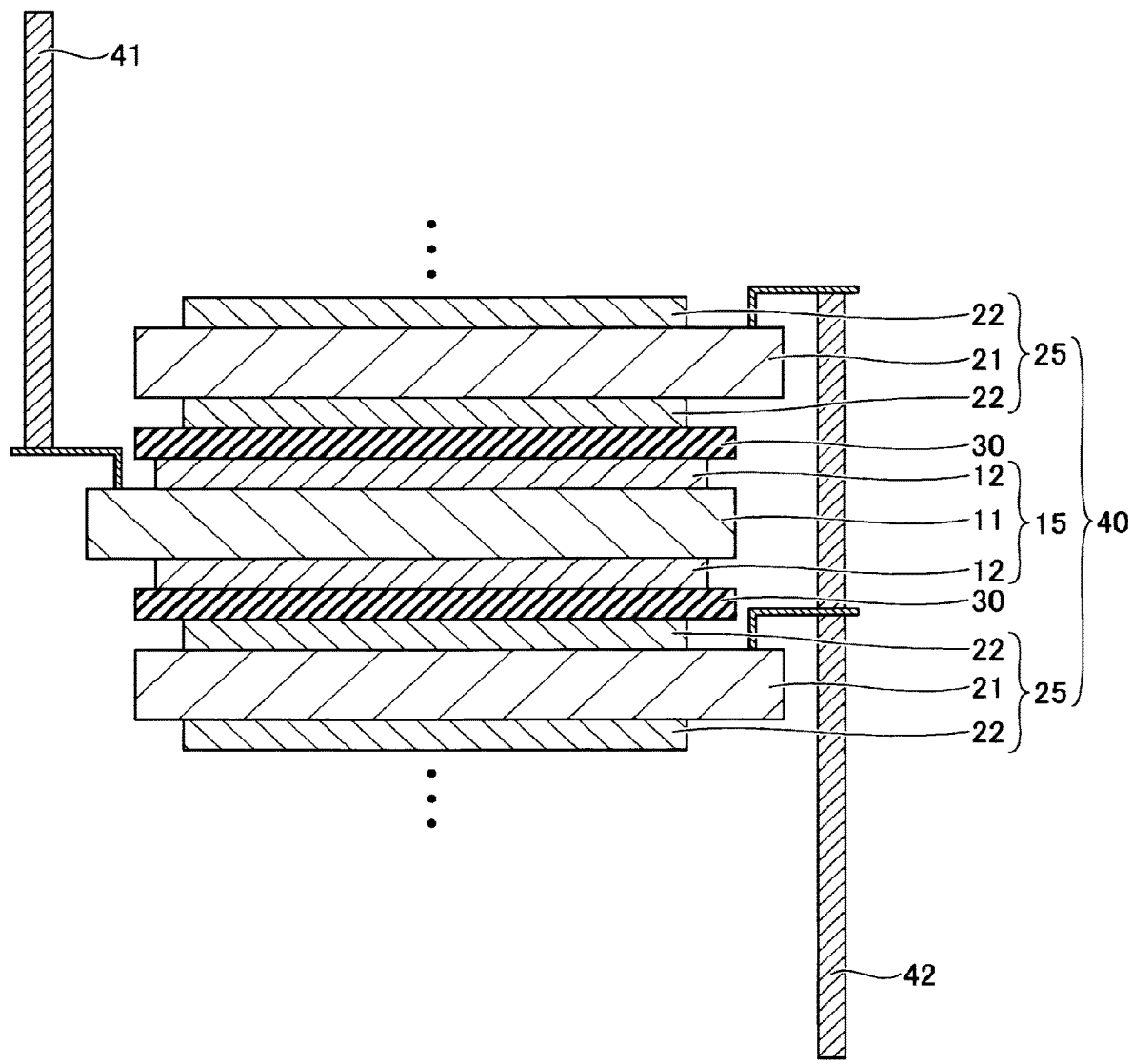
FIG. 8 is a cross-sectional diagram illustrating an electrode element used for an electrochemical element according to an embodiment of the present invention.

FIG. 8 is a schematic diagram illustrating an electrode element used for an electrochemical element of the present embodiment.

In an electrode element 40, a negative electrode 15 and a positive electrode 25 are laminated via a separator 30. The positive electrode 25 is laminated on both sides of the negative electrode 15. A lead wire 41 is connected to the negative electrode substrate 11, and a lead wire 42 is connected to the positive electrode substrate 21.

The negative electrode 15 is the same as the negative electrode 10 except that the negative electrode composite layer 12 is formed on both surfaces of the negative electrode substrate 11.

The positive electrode 25 is the same as the positive electrode 20 except that the positive electrode composite layer 22 is formed on both surfaces of the positive electrode substrate 21.

The number of laminations of the negative electrode 15 and the positive electrode 25 in the electrode element 40 is not particularly limited.

The number of the negative electrodes 15 and the number of the positive electrodes 25 in the electrode element 40 may be either the same or different.

Separator

The separator 30 is provided between the negative electrode 15 and the positive electrode 25 to prevent a short circuit between the negative electrode 15 and the positive electrode 25, as necessary.

Examples of the separator 30 include, but are not limited to, papers such as Kraft paper, vinylon mixed paper, and synthetic pulp mixed paper, cellophane, polyethylene grafted films, polyolefin nonwoven fabrics such as polypropylene melt-flow nonwoven fabric, polyamide nonwoven fabrics, glass fiber nonwoven fabrics, and micro-pore films.

The size of the separator 30 is not particularly limited as long as the separator 30 can be used for the electrochemical element.

The separator 30 may have either a single-layer structure or a multi-layer structure.

In the case of using a solid electrolyte, the separator 30 can be omitted.

Electrochemical Element

Figure 9:
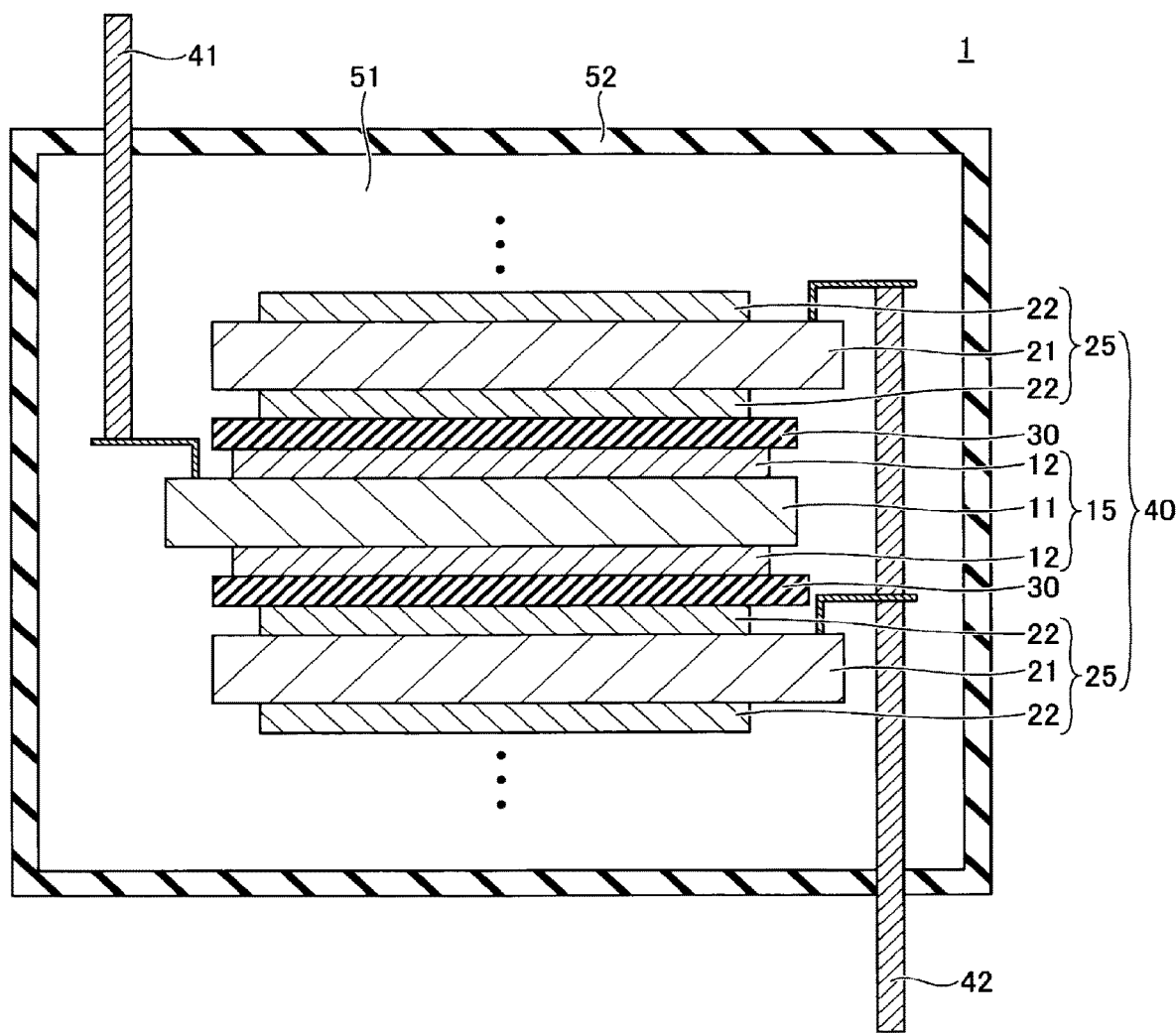
FIG. 9 is a cross-sectional diagram illustrating an electrochemical element according to an embodiment of the present invention.

FIG. 9 is a schematic diagram illustrating an electrochemical element of the present embodiment.

In an electrochemical element 1, an electrolyte layer 51 is formed by injecting an electrolyte aqueous solution or a non-aqueous electrolyte into the electrode element 40 and sealed with an exterior 52. In the electrochemical element 1, the lead wires 41 and 42 are drawn out of the exterior 52.

The electrochemical element 1 may further include other members, as necessary.

The electrochemical element 1 is not particularly limited, and examples thereof include aqueous power storage elements and non-aqueous power storage elements.

The shape of the electrochemical element 1 is not particularly limited and may be of a laminate type, a cylinder type in which a sheet electrode and a separator are assembled in a spiral manner, another cylinder type in which a pellet electrode and a separator are combined into an inside-out structure, or a coin type in which a pellet electrode and a separator are laminated.

Electrolyte Aqueous Solution

Examples of the electrolyte salt constituting the electrolyte aqueous solution include, but are not limited to, sodium hydroxide, potassium hydroxide, sodium chloride, potassium chloride, ammonium chloride, zinc chloride, zinc acetate, zinc bromide, zinc iodide, zinc tartrate, and zinc perchloride.

Non-Aqueous Electrolyte

Examples the non-aqueous electrolyte include a solid electrolyte and a non-aqueous electrolytic solution.

The non-aqueous electrolytic solution refers to an electrolytic solution in which an electrolyte salt is dissolved in a non-aqueous solvent.

Non-Aqueous Solvent

The non-aqueous solvent is not particularly limited. Preferred examples thereof include, but are not limited to, an aprotic organic solvent.

Examples of the aprotic organic solvent include, but are not limited to, carbonate-based organic solvents such as chain carbonates and cyclic carbonates. In particular, chain carbonates are preferred for their high ability for dissolving electrolyte salts.

Preferably, the aprotic organic solvent has a low viscosity.

Examples of the chain carbonates include, but are not limited to, dimethyl carbonate (DMC), diethyl carbonate (DEC), and methyl ethyl carbonate (EMC).

The proportion of the chain carbonate in the non-aqueous solvent is preferably 50% by mass or more. When the proportion of the chain carbonate in the non-aqueous solvent is 50% by mass or more, even when the non-aqueous solvent other than the chain carbonate is a cyclic substance (e.g., cyclic carbonate, cyclic ester) having a high dielectric constant, the proportion of the cyclic substance is low. Thus, even when the non-aqueous electrolytic solution has a high concentration of 2M or more, the viscosity of the non-aqueous electrolyte solution is low, which improves permeation of the non-aqueous electrolytic solution in the electrode and ion diffusion.

Examples of the cyclic carbonates include, but are not limited to, propylene carbonate (PC), ethylene carbonate (EC), butylene carbonate (BC), and vinylene carbonate (VC).

Examples of the non-aqueous solvent other than the carbonate-based organic solvents include, but are not limited to, ester-based organic solvents such as cyclic esters and chain esters, and ether-based organic solvents such as cyclic ethers and chain ethers.

Specific examples of the cyclic esters include, but are not limited to, γ-butyrolactone (γBL), 2-methyl-γ-butyrolactone, acetyl-γ-butyrolactone, and γ-valerolactone.

Specific examples of the chain esters include, but are not limited to, propionic acid alkyl esters, malonic acid dialkyl esters, acetic acid alkyl esters (e.g., methyl acetate (MA), ethyl acetate), and formic acid alkyl esters (e.g., methyl formate (MF), ethyl formate).

Specific examples of the cyclic ethers include, but are not limited to, tetrahydrofuran, alkyltetrahydrofuran, alkoxytetrahydrofuran, dialkoxytetrahydrofuran, 1,3-dioxolan, alkyl-1,3-dioxolan, and 1,4-dioxolan.

Specific examples of the chain ethers include, but are not limited to, 1,2-dimethoxyethane (DME), diethyl ether, ethylene glycol dialkyl ethers, diethylene glycol dialkyl ethers, triethylene glycol dialkyl ethers, and tetraethylene glycol dialkyl ethers.

Electrolyte Salt

The electrolyte salt is not particularly limited as long as it has high ion conductivity and is soluble in a non-aqueous solvent.

Preferably, the electrolyte salt contains a halogen atom.

Examples of cations constituting the electrolyte salt include, but are not limited to, lithium ion.

Examples of anions constituting the electrolyte salt include, but are not limited to, $BF_4^-$, $PF_6^-$, $AsF_6^-$, $CF_3SO_3^-$, $(CF_3SO_2)_2N^-$, and $(C_2F_5SO_2)_2N^-$.

The lithium salt is not particularly limited and can be suitably selected to suit to a particular application. Examples thereof include, but are not limited to, lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), and lithium bis(pentafluoroethylsulfonyl)imide ($LiN(C_2F_5SO_2)_2$). Among these, $LiPF_6$ is preferred for ion conductivity, and $LiBF_4$ is preferred for stability.

Each of these electrolyte salts may be used alone or in combination with others.

The concentration of the electrolyte salt in the non-aqueous electrolytic solution can be suitably selected to suit to a particular application. In the case of a swing-type non-aqueous power storage element, the concentration is preferably from 1 to 2 mol/L. In the case of a reserve-type non-aqueous power storage element, the concentration is preferably from 2 to 4 mol/L.

Applications of Electrochemical Element

The electrochemical element is not particularly limited in application and can be used for various purposes. For example, the electrochemical element may be used for laptop computers, pen input personal computers, mobile personal computers, electronic book players, cellular phones, portable facsimile machines, portable copiers, portable printers, headphone stereos, video movie recorders, liquid crystal display televisions, handy cleaners, portable CD players, mini disk players, transceivers, electronic organizers, calculators, memory cards, portable tape recorders, radios, backup power sources, motors, illumination apparatuses, toys, game machines, clocks, electronic flashes, and cameras.

EXAMPLES

The present invention is described in detail with reference to the following Examples but is not limited thereto.

The particle size distribution of the active material, the viscosity of the liquid composition, the peel strength of the electrode composite material, and the capacity per unit area of the electrode were measured as described below.

Particle Size Distribution of Active Material

After the active material was dispersed in the dispersion medium used in each Example, the particle size distribution of the active material was measured at 25 degrees C. by a laser diffraction particle size analyzer MASTERSIZER 3000 (available from Malvern Panalytical Ltd.).

Viscosity of Liquid Composition

The viscosity of the liquid composition was measured by a B-type viscometer (cone plate viscometer) equipped with a rotor No. CPA-40Z under a rotation speed of 100 rpm and a temperature of 25 degrees C.

Peel Strength of Electrode Composite Material

The peel strength of the electrode composite material was measured by a peel analyzer VPA-3 (available from Kyowa Interface Science Co., Ltd.) (a peel strength test method). Specifically, the prepared electrode was cut into a test piece having a width of 1 cm and a length of 10 cm, then a piece of cellophane tape was attached to one surface of the test piece on the electrode composite material side. The piece of cellophane tape was then peeled off 100 mm from one end of the test piece at a peeling speed of 30 mm/min and a peeling angle of 90 degrees, and the stress was measured at that time. This measurement operation was performed 10 times and the weighted average was determined.

Capacity Per Unit Area of Positive Electrode (Positive Electrode Active Materials 1 to 4)

The capacity per unit area of the positive electrode was measured by a charge-discharge test system TOSCAT 3001 (available from TOYO SYSTEM CO., LTD.). First, at room temperature (25 degrees C.), the non-aqueous power storage element was charged to an end-of-charge voltage of 4.2 V with a constant current of 0.1 mA/cm$^2$ and then discharged to 2.5 V with a constant current of 0.1 mA/cm$^2$, thus performing an initial charge-discharge. Next, a charge-discharge cycle in which the non-aqueous power storage element was charged to 4.2 V with a constant current of 0.1 mA/cm$^2$ and thereafter discharged to 2.5 V with a constant current of 0.1 mA/cm$^2$ was performed twice, and the capacity per unit area of the positive electrode was measured.

Capacity Per Unit Area of Positive Electrode (Positive Electrode Active Materials 5 and 6)

The capacity per unit area of the positive electrode was measured by a charge-discharge test system TOSCAT 3001 (available from TOYO SYSTEM CO., LTD.). First, at room temperature (25 degrees C.), the non-aqueous power storage element was charged to an end-of-charge voltage of 3.8 V with a constant current of 0.1 mA/cm$^2$ and then discharged to 2.7 V with a constant current of 0.1 mA/cm$^2$, thus performing an initial charge-discharge. Next, a charge-discharge cycle in which the non-aqueous power storage element was charged to 3.8 V with a constant current of 0.1 mA/cm$^2$ and thereafter discharged to 2.7 V with a constant current of 0.1 mA/cm$^2$ was performed twice, and the capacity per unit area of the positive electrode was measured.

Positive Electrode Active Materials 1 and 2

Vanadium pentoxide, lithium hydroxide, phosphoric acid, sucrose, and water were mixed to form a precipitate. The precipitate was then pulverized to obtain a precursor of vanadium phosphate particles. Next, the precursor of vanadium phosphate was burnt at 900 degrees C. in a nitrogen atmosphere to obtain lithium vanadium phosphate (LVP) (as a positive electrode active material 1) having a carbon content of 3% by mass. The positive electrode active material 1 had a mode diameter of 10 μm. The positive electrode active material 1 was further disintegrated by a jet mill to obtain a positive electrode active material 2. The positive electrode active material 2 had a mode diameter of 0.7 μm.

Positive Electrode Active Materials 3 and 4

As a positive electrode active material 3, a nickel-based positive electrode active material (NCA, available from JFE MINERAL COMPANY, LTD.) was used. The positive electrode active material 3 had a mode diameter of 12 μm. The positive electrode active material 3 was further disintegrated by a jet mill to obtain a positive electrode active material 4. The positive electrode active material 4 had a mode diameter of 1.5 μm.

Positive Electrode Active Materials 5 and 6

As a positive electrode active material 5, lithium iron phosphate (LFP, available from TATUNG FINE CHEMICALS Co.) was used. The positive electrode active material 5 had a mode diameter of 8.0 am. The positive electrode active material 5 was further disintegrated by a bead mill to obtain a positive electrode active material 6. The positive electrode active material 6 had a mode diameter of 1.0 μm.

Capacity Per Unit Area of Negative Electrode (Negative Electrode Active Materials 1 and 2)

The capacity per unit area of the negative electrode was measured by a charge-discharge test system TOSCAT 3001 (available from TOYO SYSTEM CO., LTD.). First, at room temperature (25 degrees C.), the non-aqueous power storage element was charged to an end-of-charge voltage of 1.0 V with a constant current of 0.1 mA/cm$^2$ and then discharged to 2.0 V with a constant current of 0.1 mA/cm$^2$, thus performing an initial charge-discharge. Next, a charge-discharge cycle in which the non-aqueous power storage element was charged to 1.0 V with a constant current of 0.1 mA/cm$^2$ and thereafter discharged to 2.0 V with a constant current of 0.1 mA/cm$^2$ was performed twice, and the capacity per unit area of the negative electrode was measured.

Negative Electrode Active Materials 1 and 2

As a negative electrode active material 1, lithium titanate (LTO, available from Ishihara Sangyo Kaisha, Ltd.) was used. The negative electrode active material 1 had a mode diameter of 2.0 μm. The negative electrode active material 1 was further disintegrated by a bead mill to obtain a negative electrode active material 2. The negative electrode active material 2 had a mode diameter of 1.0 µm.

Properties of the positive electrode active materials and the negative electrode active materials are shown in Table 1.

TABLE 1

| Active Material | Material | Mode Diameter [µm] |
|---|---|---|
| Positive Electrode Active Material 1 | LVP | 10 |
| Positive Electrode Active Material 2 | LVP | 0.7 |
| Positive Electrode Active Material 3 | NCA | 12 |
| Positive Electrode Active Material 4 | NCA | 1.5 |
| Positive Electrode Active Material 5 | LFP | 8.0 |
| Positive Electrode Active Material 6 | LFP | 1.0 |
| Negative Electrode Active Material 1 | LTO | 2.0 |
| Negative Electrode Active Material 2 | LTO | 1.0 |

Non-Aqueous Electrolytic Solution

In a mixed solvent of ethylene carbonate (EC)/dimethyl carbonate (DMC)/ethyl methyl carbonate (EMC) (in a mass ratio of 1:1:1), 1.5 mol/L of $LiPF_6$ was dissolved to prepare a non-aqueous electrolytic solution 1 (20 mL).

Example 1

The positive electrode active material 1 (30% by mass), carbon black (1% by mass), pentaerythritol tetraacrylate (PETTA, available from Tokyo Chemical Industry Co., Ltd., 0.3% by mass), hexamethylenediamine (HMD, available from Tokyo Chemical Industry Co., Ltd., 0.7% by mass), a catalyst diazabicycloundecene (DBU, available from Tokyo Chemical Industry Co., Ltd., 0.01% by mass), and N-methylpyrrolidone (NMP, available from FUJIFILM Wako Pure Chemical Corporation, 67.99% by mass) were mixed to prepare a liquid composition for producing a positive electrode composite material. The liquid composition for producing a positive electrode composite material had a viscosity of 15.3 mPa·s.

To an aluminum foil (as a positive electrode substrate) heated to 80 degrees C. by a hot plate, the liquid composition for producing a positive electrode composite material was applied by bar coating. Thus, a positive electrode was prepared in which the amount of the positive electrode active material per unit area was 2.1 mg/cm². The positive electrode composite material of the positive electrode had a peel strength of 0.54 N.

The positive electrode was then punched into a circle having a diameter of 16 mm and put in a coin can together with a separator (glass separator) having a thickness of 100 µm (available from ADVANTEC), the non-aqueous electrolytic solution 1, and a counter electrode (lithium electrode) having a thickness of 200 µm (available from Honjo Metal Co., Ltd.). Thus, a non-aqueous power storage element was prepared. The capacity per unit area of the positive electrode of the non-aqueous power storage element was 0.24 mAh/cm².

Example 2

The positive electrode active material 2 (30% by mass), carbon black (1% by mass), PETTA (0.3% by mass), HMD (0.7% by mass), a catalyst DBU (0.01% by mass), and a mixed dispersion medium (67.99% by mass) of NMP and propylene glycol (PG, available from FUJIFILM Wako Pure Chemical Corporation) (in a mass ratio of 7:3) were mixed to prepare a liquid composition for producing a positive electrode composite material. The liquid composition for producing a positive electrode composite material had a viscosity of 11.2 mPa·s.

The liquid composition for producing a positive electrode composite material was printed on an aluminum foil (as a positive electrode substrate) by a liquid discharge printer EV2500 (manufactured by Ricoh Co., Ltd.) and dried at 90 degrees C. Thus, a positive electrode was prepared in which the amount of the positive electrode active material per unit area was 2.1 mg/cm². The positive electrode composite material of the positive electrode had a peel strength of 0.62 N.

A non-aqueous power storage element was prepared in the same manner as in Example 1. As a result, the capacity per unit area of the positive electrode of the non-aqueous power storage element was 0.24 mAh/cm².

Example 3

The positive electrode active material 2 (30% by mass), carbon black (1% by mass), PETTA (0.3% by mass), HMD (0.7% by mass), a catalyst DBU (0.01% by mass), and a mixed dispersion medium (67.99% by mass) of NMP and 2-pyrrolidone (available from FUJIFILM Wako Pure Chemical Corporation) (in a mass ratio of 7:3) were mixed to prepare a liquid composition for producing a positive electrode composite material. The liquid composition for producing a positive electrode composite material had a viscosity of 10.5 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.1 mg/cm². The positive electrode composite material of the positive electrode had a peel strength of 0.60 N.

A non-aqueous power storage element was prepared in the same manner as in Example 1. As a result, the capacity per unit area of the positive electrode of the non-aqueous power storage element was 0.24 mAh/cm².

Example 4

The positive electrode active material 2 (40% by mass), carbon black (1% by mass), PETTA (0.3% by mass), HMD (0.7% by mass), a catalyst DBU (0.01% by mass), and a mixed dispersion medium (57.99% by mass) of NMP and 2-pyrrolidone (in a mass ratio of 7:3) were mixed to prepare a liquid composition for producing a positive electrode composite material. The liquid composition for producing a positive electrode composite material had a viscosity of 15.6 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.0 mg/cm². The positive electrode composite material of the positive electrode had a peel strength of 0.61 N.

A non-aqueous power storage element was prepared in the same manner as in Example 1. As a result, the capacity per unit area of the positive electrode of the non-aqueous power storage element was 0.23 mAh/cm².

Example 5

The positive electrode active material 2 (20% by mass), carbon black (1% by mass), PETTA (0.3% by mass), HMD (0.7% by mass), a catalyst DBU (0.01% by mass), and a mixed dispersion medium (77.99% by mass) of NMP and 2-pyrrolidone (in a mass ratio of 7:3) were mixed to prepare a liquid composition for producing a positive electrode composite material. The liquid composition for producing a positive electrode composite material had a viscosity of 9.7 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.0 mg/cm². The positive electrode composite material of the positive electrode had a peel strength of 0.61 N.

A non-aqueous power storage element was prepared in the same manner as in Example 1. As a result, the capacity per unit area of the positive electrode of the non-aqueous power storage element was 0.23 mAh/cm².

Example 6

The positive electrode active material 3 (30% by mass), carbon black (1% by mass), PETTA (0.3% by mass), HMD (0.7% by mass), a catalyst DBU (0.01% by mass), and NMP (67.99% by mass) were mixed to prepare a liquid composition. The liquid composition had a viscosity of 13.8 mPa·s.

To an aluminum foil, the liquid composition for producing a positive electrode composite material was applied by bar coating and dried at 80 degrees C. Thus, a positive electrode was prepared in which the amount of the positive electrode active material per unit area was 2.0 mg/cm². The positive electrode composite material of the positive electrode had a peel strength of 0.55 N.

A non-aqueous power storage element was prepared in the same manner as in Example 1. As a result, the capacity per unit area of the positive electrode of the non-aqueous power storage element was 0.35 mAh/cm².

Example 7

The positive electrode active material 4 (30% by mass), carbon black (1% by mass), PETTA (0.3% by mass), HMD (0.7% by mass), a catalyst DBU (0.01% by mass), and a mixed dispersion medium (67.99% by mass) of NMP and PG (in a mass ratio of 7:3) were mixed to prepare a liquid composition for producing a positive electrode composite material. The liquid composition for producing a positive electrode composite material had a viscosity of 12.4 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.2 mg/cm². The positive electrode composite material of the positive electrode had a peel strength of 0.61 N.

A non-aqueous power storage element was prepared in the same manner as in Example 1. As a result, the capacity per unit area of the positive electrode of the non-aqueous power storage element was 0.35 mAh/cm².

Example 8

The positive electrode active material 5 (30% by mass), carbon black (1% by mass), PETTA (0.3% by mass), HMD (0.7% by mass), a catalyst DBU (0.01% by mass), and NMP (67.99% by mass) were mixed to prepare a liquid composition for producing a positive electrode composite material. The liquid composition for producing a positive electrode composite material had a viscosity of 15.1 mPa·s.

To an aluminum foil, the liquid composition for producing a positive electrode composite material was applied by bar coating and dried at 100 degrees C. Thus, a positive electrode was prepared in which the amount of the positive electrode active material per unit area was 2.1 mg/cm². The positive electrode composite material of the positive electrode had a peel strength of 0.54 N.

A non-aqueous power storage element was prepared in the same manner as in Example 1. As a result, the capacity per unit area of the positive electrode of the non-aqueous power storage element was 0.29 mAh/cm².

Example 9

The positive electrode active material 6 (30% by mass), carbon black (1% by mass), PETTA (0.3% by mass), HMD (0.7% by mass), a catalyst DBU (0.01% by mass), and a mixed dispersion medium (67.99% by mass) of NMP and PG (in a mass ratio of 7:3) were mixed to prepare a liquid composition for producing a positive electrode composite material. The liquid composition for producing a positive electrode composite material had a viscosity of 14.8 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.1 mg/cm². The positive electrode composite material of the positive electrode had a peel strength of 0.55 N.

A non-aqueous power storage element was prepared in the same manner as in Example 1. As a result, the capacity per unit area of the positive electrode of the non-aqueous power storage element was 0.29 mAh/cm².

Example 10

The positive electrode active material 1 (30% by mass), carbon black (1% by mass), pentaerythritol triacrylate (PETA, available from DAICEL-ALLNEX LTD., 0.4% by mass), HMD (0.6% by mass), a catalyst DBU (0.01% by mass), and a mixed dispersion medium (67.99% by mass) of NMP and PG (in a mass ratio of 7:3) were mixed to prepare a liquid composition for producing a positive electrode composite material. The liquid composition for producing a positive electrode composite material had a viscosity of 13.2 mPa·s.

To an aluminum foil, the liquid composition for producing a positive electrode composite material was applied by bar coating and dried at 110 degrees C. Thus, a positive electrode was prepared in which the amount of the positive electrode active material per unit area was 2.1 mg/cm². The positive electrode composite material of the positive electrode had a peel strength of 0.45 N.

A non-aqueous power storage element was prepared in the same manner as in Example 1. As a result, the capacity per unit area of the positive electrode of the non-aqueous power storage element was 0.24 mAh/cm$^2$.

Example 11

The positive electrode active material 2 (30% by mass), carbon black (1% by mass), PETA (0.4% by mass), HMD (0.6% by mass), a catalyst DBU (0.01% by mass), and a mixed dispersion medium (67.99% by mass) of NMP and PG (in a mass ratio of 7:3) were mixed to prepare a liquid composition for producing a positive electrode composite material. The liquid composition for producing a positive electrode composite material had a viscosity of 12.1 mPa·s.

On an aluminum foil (as a positive electrode substrate) heated to 80 degrees C. by a hot plate, the liquid composition for producing a positive electrode composite material was printed by a liquid discharge printer EV2500 (manufactured by Ricoh Co., Ltd.). Thus, a positive electrode was prepared in which the amount of the positive electrode active material per unit area was 2.2 mg/cm$^2$. The positive electrode composite material of the positive electrode had a peel strength of 0.44 N.

A non-aqueous power storage element was prepared in the same manner as in Example 1. As a result, the capacity per unit area of the positive electrode of the non-aqueous power storage element was 0.26 mAh/cm$^2$.

Example 12

The positive electrode active material 2 (30% by mass), carbon black (1% by mass), IRR 214-K (tricyclodecane dimethanol diacrylate, available from DAICEL-ALLNEX LTD., 3.3% by mass), a polymerization initiator V-65 (2,2'-azobis(2,4-dimethylvaleronitrile, available from FUJIFILM Wako Pure Chemical Corporation, 0.033% by mass), and dipropylene glycol monomethyl ether (GPGME, 65.667% by mass) were mixed to prepare a liquid composition for producing a positive electrode composite material. The liquid composition for producing a positive electrode composite material had a viscosity of 15.1 mPa·s.

The liquid composition for producing a positive electrode composite material was printed on an aluminum foil (as a positive electrode substrate) by the liquid discharge printer EV2500 and dried at 80 degrees C. Thus, a positive electrode was prepared in which the amount of the positive electrode active material per unit area was 2.2 mg/cm$^2$. The positive electrode composite material of the positive electrode had a peel strength of 0.41 N.

A non-aqueous power storage element was prepared in the same manner as in Example 1. As a result, the capacity per unit area of the positive electrode of the non-aqueous power storage element was 0.26 mAh/cm$^2$.

Example 13

The positive electrode active material 2 (30% by mass), carbon black (1% by mass), PETA (3.3% by mass), a polymerization initiator V-65 (0.033% by mass), and GPGME (65.667% by mass) were mixed to prepare a liquid composition for producing a positive electrode composite material. The liquid composition for producing a positive electrode composite material had a viscosity of 17.1 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.2 mg/cm$^2$. The positive electrode composite material of the positive electrode had a peel strength of 0.44 N.

A non-aqueous power storage element was prepared in the same manner as in Example 1. As a result, the capacity per unit area of the positive electrode of the non-aqueous power storage element was 0.26 mAh/cm$^2$.

Example 14

The positive electrode active material 4 (30% by mass), carbon black (1% by mass), IRR 214-K (available from DAICEL-ALLNEX LTD., 1% by mass), a polymerization initiator V-65 (0.01% by mass), and GPGME (67.99% by mass) were mixed to prepare a liquid composition for producing a positive electrode composite material. The liquid composition for producing a positive electrode composite material had a viscosity of 14.9 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.2 mg/cm$^2$. The positive electrode composite material of the positive electrode had a peel strength of 0.64 N.

A non-aqueous power storage element was prepared in the same manner as in Example 1. As a result, the capacity per unit area of the positive electrode of the non-aqueous power storage element was 0.27 mAh/cm$^2$.

Example 15

The positive electrode active material 4 (30% by mass), carbon black (1% by mass), PETA (1% by mass), a polymerization initiator V-65 (0.01% by mass), and GPGME (67.99% by mass) were mixed to prepare a liquid composition for producing a positive electrode composite material. The liquid composition for producing a positive electrode composite material had a viscosity of 16.8 mPa·s.

The liquid composition for producing a positive electrode composite material was printed on an aluminum foil (as a positive electrode substrate) by a liquid discharge printer EV2500 (manufactured by Ricoh Co., Ltd.) and dried at 80 degrees C. Thus, a positive electrode was prepared in which the amount of the positive electrode active material per unit area was 2.2 mg/cm$^2$. The positive electrode composite material of the positive electrode had a peel strength of 0.66 N.

A non-aqueous power storage element was prepared in the same manner as in Example 1. As a result, the capacity per unit area of the positive electrode of the non-aqueous power storage element was 0.26 mAh/cm$^2$.

Example 16

The negative electrode active material 1 (30% by mass), carbon black (1% by mass), PETTA (0.3% by mass), HMD (0.7% by mass), a catalyst DBU (in catalytic amount), and NMP (68% by mass) were mixed to prepare a liquid composition for producing a negative electrode composite material. The liquid composition for producing a negative electrode composite material had a viscosity of 16.6 mPa·s.

To an aluminum foil (as a negative electrode substrate) heated to 80 degrees C. by a hot plate, the liquid composition for producing a negative electrode composite material was applied by bar coating. Thus, a negative electrode was prepared in which the amount of the negative electrode active material per unit area was 2.0 mg/cm$^2$. The negative electrode composite material of the negative electrode had a peel strength of 0.66 N.

The negative electrode was then punched into a circle having a diameter of 16 mm and put in a coin can together with a separator (glass separator) having a thickness of 100 µm (available from ADVANTEC), the non-aqueous electrolytic solution 1, and a counter electrode (lithium electrode) having a thickness of 200 µm (available from Honjo Metal Co., Ltd.). Thus, a non-aqueous power storage element was prepared. The capacity per unit area of the negative electrode of the non-aqueous power storage element was 0.30 mAh/cm$^2$.

Example 17

The negative electrode active material 2 (30% by mass), carbon black (1% by mass), PETTA (0.3% by mass), HMD (0.7% by mass), a catalyst DBU (0.01% by mass), and a mixed dispersion medium (67.99% by mass) of NMP and PG (in a mass ratio of 7:3) were mixed to prepare a liquid composition for producing a negative electrode composite material. The liquid composition for producing a negative electrode composite material had a viscosity of 15.4 mPa·s.

On an aluminum foil (as a negative electrode substrate) heated to 80 degrees C. by a hot plate, the liquid composition for producing a negative electrode composite material was printed by a liquid discharge printer EV2500 (manufactured by Ricoh Co., Ltd.). Thus, a negative electrode was prepared in which the amount of the negative electrode active material per unit area was 2.0 mg/cm$^2$. The negative electrode composite material of the negative electrode had a peel strength of 0.66 N.

A non-aqueous power storage element was prepared in the same manner as in Example 16. As a result, the capacity per unit area of the negative electrode of the non-aqueous power storage element was 0.30 mAh/cm$^2$.

Comparative Example 1

The positive electrode active material 1 (30% by mass), carbon black (1% by mass), polyvinylidene fluoride (PVDF, 1% by mass), and NMP (68% by mass) were mixed to prepare a liquid composition for producing a positive electrode composite material. The liquid composition for producing a positive electrode composite material had a viscosity of 1,092 mPa·s.

To an aluminum foil (as a positive electrode substrate) heated to 120 degrees C. by a hot plate, the liquid composition for producing a positive electrode composite material was applied by bar coating. Thus, a positive electrode was prepared in which the amount of the positive electrode active material per unit area was 2.0 mg/cm$^2$. The positive electrode composite material of the positive electrode had a peel strength of 0.66 N.

A non-aqueous power storage element was prepared in the same manner as in Example 1. As a result, the capacity per unit area of the positive electrode of the non-aqueous power storage element was 0.23 mAh/cm$^2$.

Comparative Example 2

The positive electrode active material 1 (30% by mass), carbon black (1% by mass), PVDF (0.5% by mass), and NMP (68.5% by mass) were mixed to prepare a liquid composition for producing a positive electrode composite material. The liquid composition for producing a positive electrode composite material had a viscosity of 611 mPa·s.

To an aluminum foil (as a positive electrode substrate) heated to 120 degrees C. by a hot plate, the liquid composition for producing a positive electrode composite material was applied by bar coating. Thus, a positive electrode was prepared in which the amount of the positive electrode active material per unit area was 2.1 mg/cm$^2$. The positive electrode composite material of the positive electrode had a peel strength of 0.37 N.

A non-aqueous power storage element was prepared in the same manner as in Example 1. As a result, the capacity per unit area of the positive electrode of the non-aqueous power storage element was 0.24 mAh/cm$^2$.

Comparative Example 3

The positive electrode active material 1 (30% by mass), carbon black (1% by mass), and NMP (69% by mass) were mixed to prepare a liquid composition for producing a positive electrode composite material. The liquid composition for producing a positive electrode composite material had a viscosity of 10.2 mPa·s. To an aluminum foil (as a positive electrode substrate) heated to 120 degrees C. by a hot plate, the liquid composition for producing a positive electrode composite material was applied by bar coating. Thus, a positive electrode was prepared in which the amount of the positive electrode active material per unit area was 2.1 mg/cm$^2$. The positive electrode composite material of the positive electrode had a peel strength of 0.002 N.

An attempt was made to prepare a non-aqueous power storage element in the same manner as in Example 1. However, when the positive electrode was punched into a circle having a diameter of 16 mm, the positive electrode composite material was peeled off from the aluminum foil, resulting in non-preparation of non-aqueous power storage element.

The measurement results for the viscosity of the liquid composition, the peel strength of the electrode composite material, and the capacity per unit area of the electrode were shown in Table 2.

TABLE 2

| | Active Material | | Dispersion Medium | | | | Peel Strength of Electrode Composite Material [N] | Capacity per Unit Area of Electrode [mAh/cm²] |
|---|---|---|---|---|---|---|---|---|
| | Type | Content [% by mass] | Material | Mass Ratio | Polymerizable Compound | Viscosity [mPa·s] | | |
| Example 1 | Positive Electrode Active Material 1 | 30 | NMP | — | PETTA HMD | 15.3 | 0.54 | 0.24 |
| Example 2 | Positive Electrode Active Material 2 | 30 | NMP/PG | 7/3 | PETTA HMD | 11.2 | 0.62 | 0.24 |
| Example 3 | Positive Electrode Active Material 2 | 30 | NMP/2-Pyrrolidone | 7/3 | PETTA HMD | 10.5 | 0.68 | 0.24 |
| Example 4 | Positive Electrode Active Material 2 | 40 | NMP/2-Pyrrolidone | 7/3 | PETTA HMD | 15.6 | 0.61 | 0.23 |
| Example 5 | Positive Electrode Active Material 2 | 20 | NMP/2-Pyrrolidone | 7/3 | PETTA HMD | 9.7 | 0.56 | 0.23 |
| Example 6 | Positive Electrode Active Material 3 | 30 | NMP | — | PETTA HMD | 13.8 | 0.55 | 0.35 |
| Example 7 | Positive Electrode Active Material 4 | 30 | NMP/PG | 7/3 | PETTA HMD | 12.4 | 0.61 | 0.35 |
| Example 8 | Positive Electrode Active Material 5 | 30 | NMP | — | PETTA HMD | 15.1 | 0.54 | 0.29 |
| Example 9 | Positive Electrode Active Material 6 | 30 | NMP/PG | 7/3 | PETTA HMD | 14.8 | 0.55 | 0.29 |
| Example 10 | Positive Electrode Active Material 1 | 30 | NMP/PG | 7/3 | PETA HMD | 13.2 | 0.45 | 0.24 |
| Example 11 | Positive Electrode Active Material 2 | 30 | NMP/PG | 7/3 | PETA HMD | 12.1 | 0.44 | 0.26 |
| Example 12 | Positive Electrode Active Material 2 | 30 | DPGME | — | IRR 214-K | 15.1 | 0.41 | 0.26 |
| Example 13 | Positive Electrode Active Material 2 | 30 | DPGME | — | PETA | 17.1 | 0.44 | 0.26 |
| Example 14 | Positive Electrode Active Material 4 | 30 | DPGME | — | IRR 214-K | 14.9 | 0.64 | 0.27 |
| Example 15 | Positive Electrode Active Material 4 | 30 | DPGME | — | PETA | 16.8 | 0.66 | 0.26 |
| Example 16 | Negative Electrode Active Material 1 | 30 | NMP | — | PETTA HMD | 16.6 | 0.66 | 0.30 |
| Example 17 | Negative Electrode Active Material 2 | 30 | NMP/PG | 7/3 | PETTA HMD | 15.4 | 0.66 | 0.30 |
| Comparative Example 1 | Positive Electrode Active Material 1 | 30 | NMP | — | — | 1,092 | 0.66 | 0.23 |

TABLE 2-continued

| | Active Material | | Dispersion Medium | | Polymerizable Compound | Viscosity [mPa·s] | Peel Strength of Electrode Composite Material [N] | Capacity per Unit Area of Electrode [mAh/cm²] |
|---|---|---|---|---|---|---|---|---|
| | Type | Content [% by mass] | Material | Mass Ratio | | | | |
| Comparative Example 2 | Positive Electrode Active Material 1 | 30 | NMP | — | — | 611 | 0.37 | 0.24 |
| Comparative Example 3 | Positive Electrode Active Material 1 | 30 | NMP | — | — | 10.2 | 0.002 | — |

It is clear from Table 2 that, in the electrodes of Examples 1 to 17, the peel strength of the electrode composite material is large.

On the other hand, in the electrode of Comparative Example 1, the viscosity of the liquid composition is low, so that the productivity of electrode is low.

Moreover, in the electrodes of Comparative Examples 2 and 3, the peel strength of the electrode composite material is small since the liquid composition contains no polymerizable compound.

Figure 10:
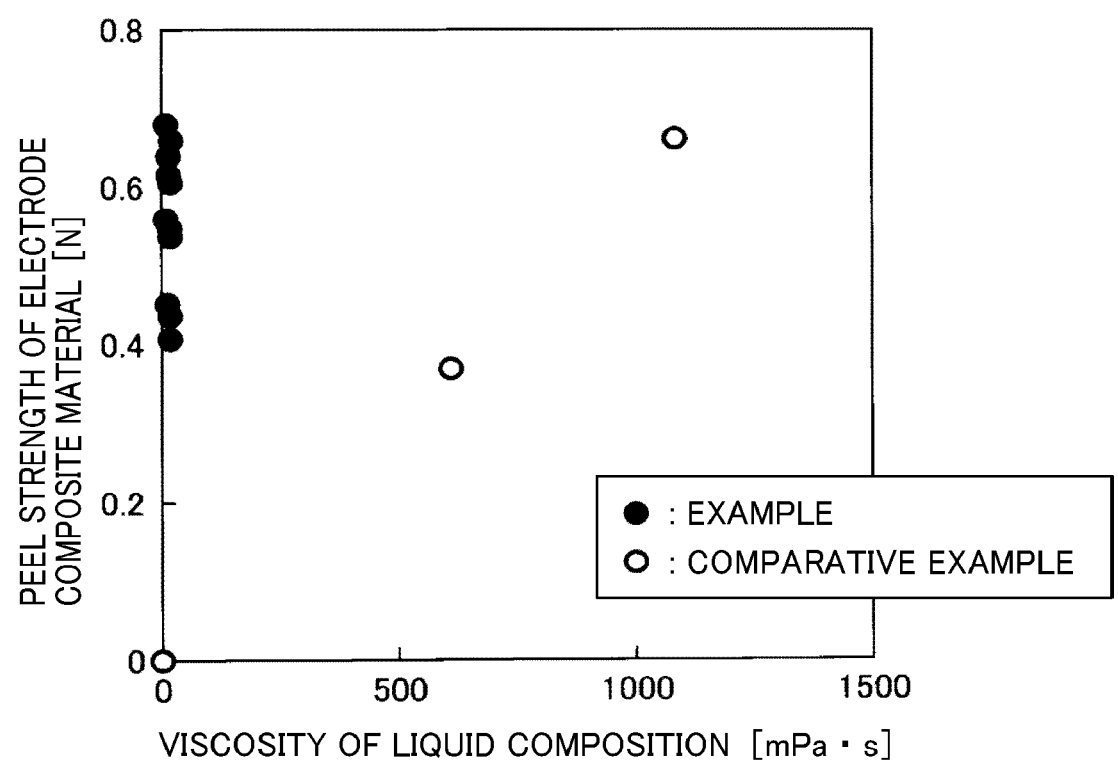
FIG. 10 is a graph showing the relationship between the viscosity of liquid compositions and the peel strength of electrode composite materials in Examples and Comparative Examples.

FIG. 10 is a graph showing the relationship between the viscosity of the liquid compositions and the peel strength of the electrode composite materials in Examples and Comparative Examples.

It is clear from FIG. 10 that, when the liquid composition containing the polymerizable compound is used, the peel strength of the electrode composite material is large even when the viscosity of the liquid composition is low, compared to the case of using the liquid composition containing the binder.

High-Rate Discharge Test

The capacity per unit area of the electrode of each of Examples 1 and 12 was measured in the same manner as in Examples 1 and 12 except that the current in the discharging was changed to 1 mA/cm². As a result, the value represented by the formula (Capacity when discharged at a current of 1 mA/cm²)/(Capacity when discharged at a current of 0.1 mA/cm²) for the positive electrode in each of Examples 1 and 12 was 95.1% and 97.2%, respectively. Next, the capacity per unit area of the electrode of each of Examples 1 and 12 was measured in the same manner as in Examples 1 and 12 except that the current in the discharging was changed to 5 mA/cm². As a result, the value represented by the formula (Capacity when discharged at a current of 5 mA/cm²)/(Capacity when discharged at a current of 0.1 mA/cm²) for the positive electrode in each of Examples 1 and 12 was 87.3% and 94.2%, respectively.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid composition suitable for an electrode composite material, the composition comprising:
    an active material comprising of graphite having a mode diameter of 0.5 um or more;
    a dispersion medium: and
    a polymerizable compound,
    wherein a viscosity of the liquid composition at 25° C. is in a range of from 9.5 to 50 mPas,
    the polymerizable compound consists of (i) at least one polymerization initiator and/or catalyst, (ii) at least one acrylate, methacrylate, urethane acrylate resin, vinyl ester resin, unsaturated polyester, epoxy resin, oxetane resin, vinyl ether, a resin utilizing an ene-thiol reaction, or a mixture of two or more of any of these, and optionally (i) at least one sensitizing dye,
    the polymerization initiator functions substantially only as a polymerization initiator of polymerizable groups of monomers of the polymerizable compound: and
    wherein a 10% diameter (D10) of said graphite active material is 0.1 um or more, and 0.8 um or less.

2. The composition of claim 1, wherein the active material is capable of being reversibly intercalated or de intercalated with an alkali metal ion.

3. The composition of claim 1, wherein a proportion of the active material in the liquid composition is 20% by mass or more.

4. The composition of claim 1, wherein the active material has a maximum particle diameter equal to or smaller than a nozzle diameter of the liquid discharge head.

5. The composition of claim 1, wherein the active material has a mode diameter of 3 μm or less.

6. The composition of claim 1, wherein the dispersion medium comprises a porogen.

7. A method for producing an electrode, the method comprising:
    applying the composition of claim 1 to an electrode substrate.

8. A method for producing an electrochemical element, the method comprising:
    producing an electrode by the method of claim 7.

9. The composition of claim 1, wherein the polymerizable compound comprises an ester obtained by:
    epoxidizing a double bond of a terpene comprising an unsaturated bond, to obtain an epoxide; and adducting acrylic acid and/or methacrylic acid to the epoxide, to obtain the acrylate and/or methacrylate of the polymerizable compound.

10. The composition of claim 9, wherein the terpene comprises myrcene, carene, ocimene, pinene, limonene, camphene, terpinolene, tricyclene, terpinene, fenchene, phellandrene, sylvestrene, sabinene, dipentene, bornene, isopulegol, and/or carvone.

11. The composition of claim 9, wherein the terpene-derived alcohol comprises citronellol, pinocampheol, geraniol, fenchyl alcohol, nerol, borneol, linalool, menthol, terpineol, thujyl alcohol, citronellal, ionone, irone, cineral, citral, pinol, cyclocitral, carvomenthone, ascaridole, safranal, piperitol, menthene monool, dihydrocarvone, carveol, sclareol, manool, hinokiol, ferruginol, totarol, sugiol, farnesol, patchouli alcohol, nerolidol, carotol, cadinol, lanceol, eudesmol, and/or phytol.

12. The composition of claim 1, wherein the polymerizable compound comprises an ester of a terpene-derived alcohol with acrylic acid and/or methacrylic acid, as the acrylate and/or methacrylate of the polymerizable compound.

13. The composition of claim 1, wherein the polymerizable compound comprises citronellic acid, hinokiic acid, and santalic acid.

14. The composition of claim 1, wherein the polymerizable compound comprises an acrylate and/or methacrylate comprising a side chain comprising a menthone, carvotanacetone, phellandral, pimelitenone, perillaldehyde, thujone, calone, dageton, camphor, bisabolene, santalene, zingiberene, caryophyllene, curcumene, cedrene, cadinene, longifolene, sesquibenihene, cedrol, guaiol, kessoglycol, cyperone, eremophilone, zerumbone, camphorene, podocarprene, mylene, phyllocladene, totalene, ketomanoyl oxide, manoyl oxide, abietic acid, pimaric acid, neoabietic acid, levopimaric acid, iso-d-pimaric acid, agathene dicarboxylic acid, rubenic acid, carotenoid, peryl aldehyde, piperitone, ascaridole, pimene, fenchene, a sesquiterpene, a diterpene, or a triterpene backbone.

15. The composition of claim 1, wherein the dispersion medium comprises dipropylene glycol monomethyl ether, diethylene glycol monomethyl ether, ethylene glycol monobutyl ether, γ-butyrolactone, propylene carbonate, and/or N,N-dimethylacetamide.

16. The composition of claim 1, wherein the active material comprises natural graphite, or synthetic graphite.

17. The composition of claim 1, wherein the monomers of the polymerizable compound consist of the acrylate, methacrylate, urethane acrylate resin, vinyl ester resin, unsaturated polyester, epoxy resin, oxetane resin, vinyl ether, a resin utilizing an ene-thiol reaction, or a mixture of two or more of any of these.

18. The composition of claim 1, wherein the polymerization initiator is an organic compound.

19. The composition of claim 1, wherein said mode diameter is from 0.5 μm to 3 μm.

20. The composition of claim 1, wherein said dispersion medium is a porogen that is capable of dissolving said polymerizable compound and phase-separating a resulting polymer of polymerization of said polymerizable compound.

21. A liquid composition suitable for an electrode composite material, the composition comprising:
an active material comprising of graphite having a mode diameter of 0.5 um or more:
a dispersion medium: and
a polymerizable compound,
wherein a viscosity of the liquid composition at 25° C. is in a range of from 9.5 to 50 mPas,
the polymerization initiator is at least one selected from the group consisting of α-hydroxyacetophenone, α-aminoacetophenone, 4-aroyl-1,3-dioxolane, benzyl ketal, 2,2-diethoxyacetophenone, p-dimethylaminoacetophene, p-dimethylaminopropiophenone, benzophenone, 2-chlorobenzophenone, 4,4'-dichlorobenzophenone, 4,4'-bis(diethylamino)-benzophenone, Michler's ketone, benzil, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tertbutyl peroxide, (1-hydroxycyclohexyl)-phenylketone, 2-hydroxy-2-methyl-1-phenyl-1-one, 1-(4-isopropylphenyl)-2-hydroxy-2-methylpropane-1-one, methyl benzoylformate, a benzoin alkyl ether, 2-benzyl-2-dimethylamino-1-(4-morpholinophenyl)butanone-1, 2,2-dimethoxy-1,2-diphenylethane-1-one, bis($\eta^5$-2,4-cyclopentadiene-1-yl)-bis[2,6-difluoro-3-(1H-pyrrole-1-yl)phenyl] titanium, bis(2,4,6-trimethylbenzoyl)phenylphosphine oxide, 2-methyl-1-[4-(methylthio) phenyl]-2-morpholinopropane-1-one, 2-hydroxy-2-methyl-1-phenylpropane-1-one, bis(2,6-dimethoxybenzoyl)-2,4,4-trimethylpentylphosphine oxide, 1-[4-(2-hydroxyethoxy)phenyl]-2-hydroxy-2-methyl-1-propane-1-one, monoacylphosphine oxide, disacylphosphine oxide, titanocene, fluorescein, anthraquinone, thioxanthone, xanthone, lophine dimer, a trihalomethyl compound, a dihalomethyl compound, an active ester compound, an organic boron compound, a bisazide compound, azobisisobutyronitrile, onium salt, diazonium salt, quinone diazide, organic halide, aromatic sulfonate, bisulfone compound, sulfonyl compounds, sulfonate, sulfonium salt, sulfamide, iodonium salt, sulfonyl diazomethane compound, and a mixture of two or more of these photoradical generators or thermal polymerization initiators, or photoacid generators; and
wherein a 10% diameter (D10) of said graphite active material is 0.1 um or more, and 0.8 um or less.

* * * * *